United States Patent [19]

Egley et al.

[11] Patent Number: 5,186,053
[45] Date of Patent: Feb. 16, 1993

[54] TEMPERATURE COMPENSATED PROOFMASS ASSEMBLY FOR ACCELEROMETERS

[75] Inventors: Bert D. Egley, Tacoma, Wash.; G. Richard Newell, Alamo, Calif.; Richard A. Hanson, Redmond, Wash.

[73] Assignee: New SD, Inc., San Francisco, Calif.

[21] Appl. No.: 633,375

[22] Filed: Dec. 19, 1990

[51] Int. Cl.⁵ .............................................. G01P 15/08
[52] U.S. Cl. ................................. 73/497; 73/517 AV
[58] Field of Search ................. 73/497, 517 AV, 514, 73/517 R

[56] References Cited

U.S. PATENT DOCUMENTS

| | | | |
|---|---|---|---|
| 4,221,131 | 9/1980 | Albert | 73/517 AV |
| 4,483,194 | 11/1984 | Rudolf | 73/517 R |
| 4,926,689 | 5/1990 | Hanson | 73/497 |

Primary Examiner—John E. Chapman
Attorney, Agent, or Firm—Flehr, Hohbach, Test, Albritton & Herbert

[57] ABSTRACT

Proofmass assembly for an accelerometer having transducers fabricated of crystalline quartz and other components fabricated of fused quartz. The assembly includes a main support, a frame pivotally connected to the support for pendulous movement about a hinge axis such that the frame moves with a component of motion along the sensing axis of the accelerometer, a proofmass connected to the frame for movement about a compensation axis spaced from and generally parallel to the hinge axis, and a pair of transducers connected between the proofmass and the support for sensing forces produced by acceleration of the proofmass along the sensing axis. Differences in thermal expansion between the transducers and the fused quartz components are taken up by rotation of the proofmass about the compensation axis, and the two parallel axes permit translational motion of the proofmass in response to acceleration along the sensing axis without rotation of the proofmass relative to the support.

7 Claims, 2 Drawing Sheets

TEMPERATURE COMPENSATED PROOFMASS ASSEMBLY FOR ACCELEROMETERS

This invention relates generally to transducers such as accelerometers and, more particularly, to a proofmass assembly which forms part of the transducer and is designed to minimize errors in the operation of the transducer due to mismatched thermal expansion rates between certain components thereof.

Crystalline quartz force transducers, sometimes referred to as force crystals, are well known in the art, and a number of specific examples of such transducers are found in U.S. Pat. Nos. 4,856,350 and 4,970,903. The crystalline quartz material is employed in such transducers because of its piezoelectric properties and its ability to provide electrical signals corresponding to forces applied thereto.

Proofmass assemblies constructed primarily of fused quartz are also well known in the art, and examples of such assemblies are found in U.S. Pat. Nos. 4,926,689 and 4,955,233. The fused quartz material is easier to fabricate to the shapes required in a proofmass suspension than the crystalline material (e.g., a frame, flexures, pads, etc.) and is therefore more suitable for use in a proofmass assembly.

It is also well known in the art to combine crystalline quartz force transducers with proofmass assemblies constructed primarily of fused quartz to produce a transducer such as an accelerometer, and an example of an accelerometer employing this combination is illustrated diagrammatically in FIG. 1. This device, which is designated generally by the reference numeral 10, is shown as having a rectangular circumferential support frame 12 which is connected to an external housing (not shown) by means of support pads 14. The device also includes a proofmass assembly 15 consisting of a pendulum 16 and a pair of proofmasses 18 fixedly mounted to opposite sides of the pendulum.

The proofmass assembly 15 is supported to one side of frame 12 by an arrangement of flexures 20 for limited pendulous movement along a sensing axis SA, and acceleration acting on the proofmass assembly along this axis is monitored by a pair of force transducers 22 connected to the proofmasses 18 on opposite sides of the pendulum. As the device is accelerated along the sensing axis, forces induced by the acceleration apply tensive and compressive loads to the force transducers.

Force transducers 22 are constructed of crystalline quartz material with piezoelectric properties, whereas the pendulum, flexures, frame and housing are constructed of fused quartz which is easier to fabricate to the shapes required. Since crystalline quartz has a thermal coefficient of expansion of about 8 ppm/° F. and fused quartz has a thermal coefficient of expansion of about 0.31 ppm/° F., there is a substantial mismatch between thermal coefficients of expansion of the two materials. As a result, when the accelerometer is subjected to changes in temperature, the force transducers will expand or contract to a greater extent than the pendulum and other elements of the proofmass and suspension assembly, applying forces to the transducers which may produce erroneous measurements of acceleration.

Heretofore, there have been attempts to compensate for the mismatched thermal expansion rates of the crystalline quartz transducers and the fused quartz proofmass and suspension assembly in an accelerometer. One such approach is illustrated in exploded perspective form in FIG. 2 and described in greater detail in U.S. Pat. No. 4,872,342 and in an article entitled SUPER-FLEX: A SYNERGISTIC COMBINATION OF VIBRATING BEAM AND QUARTZ FLEXURE ACCELEROMETER TECHNOLOGY appearing in NAVIGATION: JOURNAL OF THE INSTITUTE OF NAVIGATION, VOLUME 34, NO. 4, WINTER 1987-88, pages 337-353. In this approach, an accelerometer, designated generally by the reference numeral 24, includes force crystals 26 and a quartz suspension assembly 28 having an outer frame 30 and a suspension member 32 mounted within and to the frame by a pair of flexures 34. The flexures are designed to provide compliance to both translation and rotation of the suspension member (and proofmasses mounted thereto), translation being provided by s-bending of the flexures, and rotation being provided by simple bending. The translation mode allows for acceleration measurement by sensing the forces required to resist the translating mass. The rotational mode minimizes the effects of errors due to mismatched thermal expansion rates between different components of the device.

While the device illustrated in FIG. 2 does address the problem of mismatched thermal expansion rates between specific components in a transducer, it does so in a way which creates another problem of equal or greater significance. In order for the flexures 34 to S-bend in order to provide translation, they must be relatively long. However, as the length of a flexure increases, its stiffness decreases, and the relatively long flexures thus make the natural frequency of suspension member 32 relatively low so that local noise or surrounding vibration could cause the suspension member to resonate, resulting in an erroneous output signal or fracturing of the crystals or flexures. If the flexures are made shorter or thicker, there will be even larger errors resulting from the inevitable strains to which the flexures are subjected during assembly and operation of the device.

Another prior approach to compensating for the thermal expansion problem is illustrated in FIG. 3 and in greater detail in U.S. Pat. No. 4,718,275. This accelerometer has a proofmass 36 mounted to a housing 37 by a flexure hinge 38 for movement along a sensing axis SA. It also has a beam 39 which is pivotally connected to the proofmass at 41 for rotational movement about a compensation axis CA which is perpendicular to both the sensing axis and the hinge axis, and a pair of force transducers 42 connected between the beam and the housing on opposite sides of the pivot. Acceleration along the sensing axis results in a compressive force on one of the transducers and a tensive force on the other. When the accelerometer is subjected to temperature changes, differential thermal expansion or contraction between the transducers and the proofmass, beam, flexure hinge and housing will result in forces that tend to rotate the beam about the pivot, rather than tensioning or compressing the transducers. However, when an acceleration is applied along the sensing axis, the proofmass and the beam undergo a combination of rotation and translation, subjecting the transducers to bending moments which can produce errors in the output readings.

Another accelerometer in which differences in thermal expansion are absorbed by rotation about an axis perpendicular to the hinge axis is illustrated in FIG. 4 and described in greater detail in U.S. Pat. Nos.

4,750,363 and 4,891,982. This accelerometer has a proofmass 44 mounted to a housing 46 by a pair of side-by-side flexure hinges 47 for pendulous movement along a sensing axis SA. Force transducers 48 are connected between the housing and a pair of arms 49 which extend from opposite sides of the proofmass in a direction parallel to the pivot axis of the flexure hinges. In this device, differences in thermal expansion between the transducers and the rest of the assembly cause the proofmass to rotate about a compensating axis CA which is perpendicular to the sensing axis and intersects the axis about which the flexure hinges bend at a point between the flexures. This approach has the same disadvantage as the device of FIG. 3 in that acceleration applied along the sensing axis results in a rotational movement of the proofmass as it pivots about the flexure hinges, which subjects the transducers to bending moments and results in erroneous output readings from some types of transducers.

It is in general an object of the invention to provide an new and improved proofmass assembly for an accelerometer which minimizes errors due to mismatched thermal expansion rates between different components thereof.

Another object of the invention is to provide a proofmass assembly of the above character which overcomes the limitations and disadvantages of proofmass assemblies heretofore provided.

These and other objects are achieved in accordance with the invention by providing a proofmass assembly for an accelerometer having a main support, a frame pivotally connected to the support for pendulous movement about a hinge axis such that the frame moves with a component of motion along the sensing axis, a proofmass connected to the frame for movement about a compensation axis spaced from and generally parallel to the hinge axis, and a pair of crystalline quartz transducers connected between the proofmass and the support for sensing forces produced by acceleration of the proofmass along the sensing axis. The support, frame and other elements of the assembly are fabricated of fused quartz which has a different coefficient of thermal expansion than the transducers, and differences in expansion between the transducers and the other elements are taken up by rotation of the proofmass about the compensation axis. When an acceleration is applied along the sensing axis, the proofmass translates without rotation relative to the support and without subjecting the transducers to complex bending moments.

Figure 1:
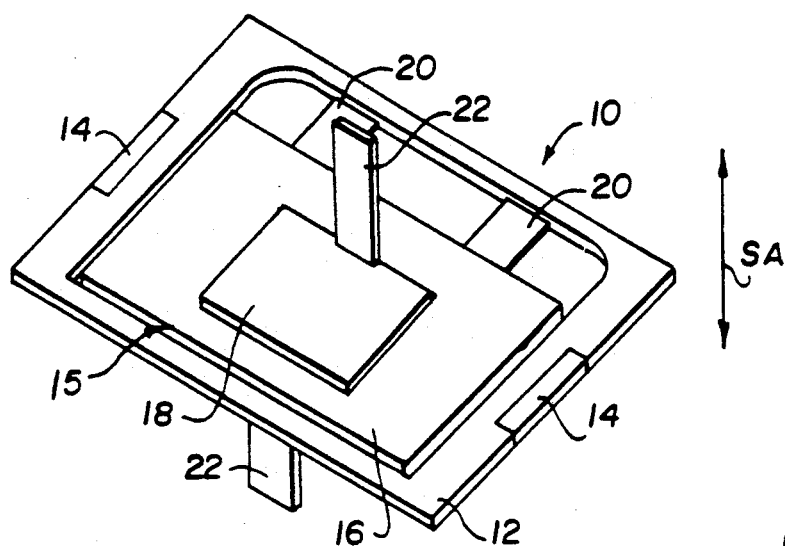
FIG. 1 is a conceptual view illustrating the operating principle of one type of acceleration sensing device found in the prior art.
Figure 2:
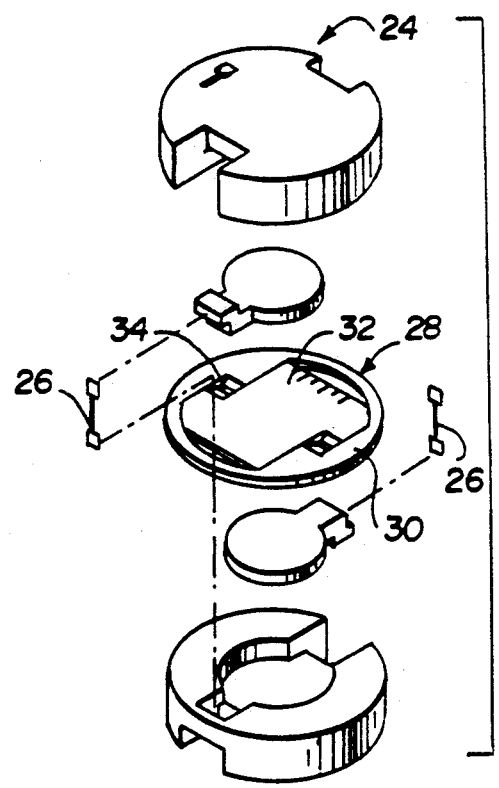
FIG. 2 is an exploded isometric view of a prior accelerometer with compensation for differential thermal expansion or contraction.
Figure 3:
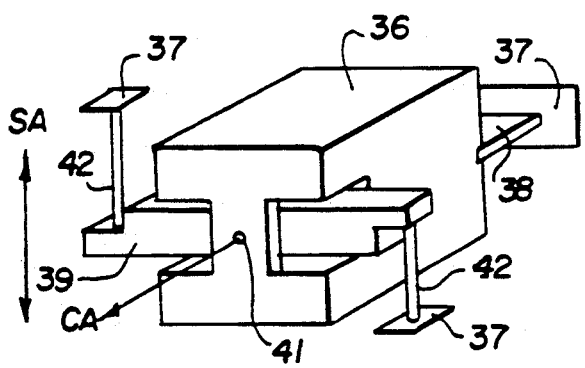
FIGS. 3 and 4 are isometric views of additional prior art accelerometers with compensation for differential thermal expansion or contraction.
Figure 4:
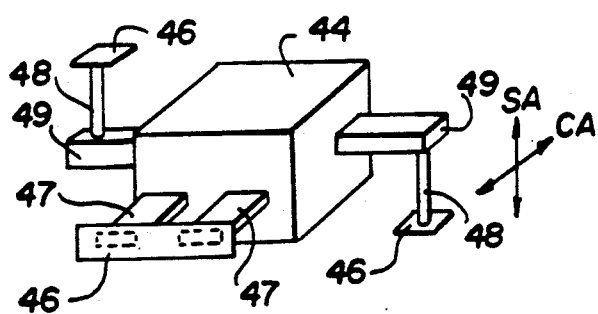
Figure 5:
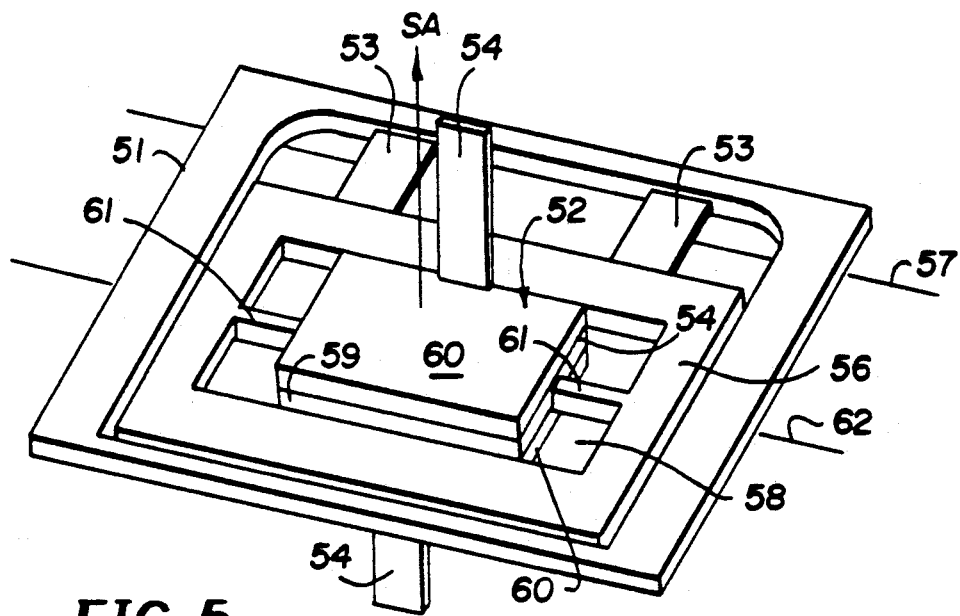
FIG. 5 is an isometric view of one embodiment of a proofmass assembly for use in an accelerometer according to the invention.

As illustrated in FIG. 5, the proofmass assembly includes a generally rectangular circumferential support frame 51, a pendulum assembly 52, a pair of flexures 53 which mount the pendulum assembly to frame 51 for limited movement along a sensing axis SA, and a pair of force sensing transducers 54 which are responsive to forces produced by acceleration of the pendulum assembly along the sensing axis.

Pendulum assembly 52 includes a generally rectangular frame 56 which is mounted to support frame 51 by flexures 53 for pivotal movement about an axis 57 perpendicular to the sensing axis SA. The pendulum frame is disposed in the central opening of the support frame and in coplanar alignment with the support frame. The pendulum frame has a generally rectangular central opening 58 in which a pendulum mass assembly comprising a planar, rectangular pendulum 59 having a pair of proofmasses or weights 60 affixed to opposite sides thereof is supported. The pendulum mass assembly is mounted to the pendulum frame by a pair of torsion hinges 61 for rotational movement about an axis 62 which is spaced from and parallel to flexure axis 57. In one presently preferred embodiment, frame 51, flexures 53, pendulum 59 and hinges 61 are formed as an integral unit by etching or other suitable processing of a wafer or block of fused quartz material or other materials having a thermal expansion coefficient closely matched to that of fused quartz.

The force sensing transducers 54 are connected between opposite edges of pendulum 59 and the accelerometer housing (not shown) and extend parallel to the sensing axis in opposite directions from the pendulum. Thus, movement of the pendulum assembly along the sensing axis applies a compressive force to one transducer and a tensive force to the other.

Transducers 54 are constructed of crystalline quartz material, whereas the other elements of the proofmass assembly (e.g., frame 51, pendulum assembly 52, flexures 53 and the accelerometer housing) are constructed of fused quartz or other materials having a coefficient of expansion similar to fused quartz. Consequently, the transducers have a greater coefficient of thermal expansion and will expand and contract at a greater rate with changes in temperature than the rest of the device. The difference in expansion or contraction is taken up by torsional rotation of the pendulum assembly about hinge axis 62, thereby isolating the transducers from compressive or tensive forces due to changes in temperature.

The proofmass assembly of FIG. 5 provides a significant advantage over the proofmass assemblies of the prior art in which differences in thermal expansion or contraction are taken up by rotation about an axis perpendicular to the hinge axis. As noted above, in the prior art devices the pendulum undergoes two axis rotational movement, which results in the application of undesirable bending moments to the force transducers, producing possibly erroneous output readings. In the embodiment of FIG. 5, however, when an acceleration is applied along the sensitive axis, there is no rotational movement of the pendulum relative to the transducers and no bending of the transducers to produce erroneous readings. This is because the compensation axis 62 is parallel to the flexure axis 57, and any rotation of the outer frame 56 of the pendulum assembly about the flexure axis is offset by an equal but opposite rotation of the pendulum 59 about the compensation axis. Thus, the plane of the pendulum structure remains perpendicular to the sensing axis, with no twisting or asymmetric loading of each of the transducers.

Figure 6:
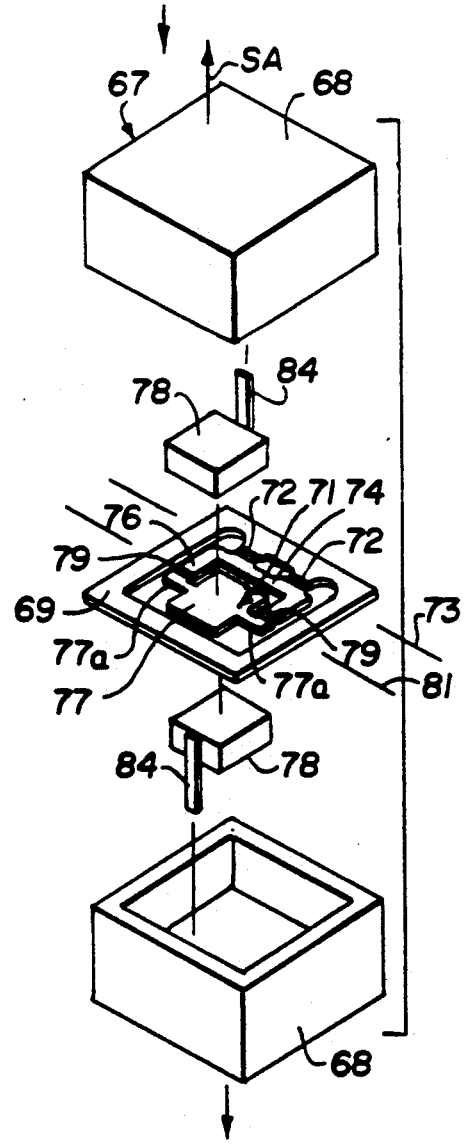
FIG. 6 is an exploded isometric view of an embodiment of an accelerometer with a proofmass assembly according to the invention.

The accelerometer illustrated in FIG. 6 includes a proofmass assembly 66 mounted in a generally rectangular housing 67 formed in two sections 68. The proofmass assembly includes a generally rectangular circumferential support frame 69 which is affixed between the confronting faces of the peripheral walls of the two housing sections A pendulum assembly 71 is pivotally mounted to the frame by a pair of flexures 72 for movement about an axis 73 perpendicular to a sensing axis SA.

Pendulum assembly 71 includes a U-shaped bridge 74 which has a pair of spaced apart, generally parallel arms 76 and is mounted to support frame 69 by flexures 72. A pendulum mass assembly comprising a generally rectangular pendulum 77 having a pair of proofmasses or weights 78 affixed to opposite sides thereof and a pair of arms 77a extending from opposite ends thereof is pivotally connected to the arms of bridge 74 by flexures 79 for movement about an axis 81 which is spaced from and generally parallel to axis 73. Frame 69, flexures 72, bridge 74, pendulum 77 and flexures 79 are formed as an integral, generally planar structure by etching or other suitable fabrication techniques from a wafer or block of fused quartz or other materials having a thermal expansion coefficient closely matched to that of fused quartz.

A pair of force sensing transducers 84 are connected between opposite edges of pendulum 77 and housing 67 and extend parallel to the sensing axis in opposite directions from the pendulum. Thus, as in the embodiment of FIG. 5, movement of the pendulum assembly along the sensing axis applies a compressive force to one transducer and a tensive force to the other.

Transducers 84 are constructed of crystalline quartz material, which has a greater coefficient of thermal expansion than the fused quartz material or other material of the other elements in the device, e.g. frame 69, pendulum assembly 71, flexures 72, and housing 67. Consequently, the transducers will expand and contract at a greater rate with changes in temperature than the rest of the device, and the difference in expansion or contraction is taken up by rotation of the pendulum about axis 81 just as it is taken up by rotation about hinge axis 62 in the embodiment of FIG. 5.

The proofmass assembly in the accelerometer of FIG. 6 has the same advantage over the prior art as the proofmass assembly of FIG. 5 in that there is no rotational movement of the pendulum relative to the transducers and no bending of the transducers to produce erroneous readings. This is because the compensation axis 81 is parallel to the flexure axis 73, and any rotation of bridge 74 about axis 73 is offset by an equal but opposite rotation of the pendulum 77 about the compensation axis. Thus, as in the embodiment of FIG. 5, the plane of the pendulum structure remains perpendicular to the sensing axis, with no twisting or asymmetric loading of the transducers to distort the readings produced by forces induced by acceleration. In the embodiment of FIG. 6, the flexures 79 are typically thinner and more compliant than the torsion hinges 61 and are therefore able to take up a greater differential in expansion and contraction between the transducers and the rest of the device.

The invention has a number of important features and advantages. It provides accurate measurements of acceleration notwithstanding differential expansion or contraction due to different coefficients of thermal expansion in different parts of the device, and it does so in a manner which does not subject the transducers in the device to spurious bending or twisting which could produce errors in the measurements.

It is apparent from the foregoing that a new and improved acceleration sensing device has been provided. While only certain presently preferred embodiments have been described in detail, as will be apparent to those familiar with the art, certain changes and modifications can be made without departing from the scope of the invention as defined by the following claims.

We claim:

1. In a temperature compensated device for measuring acceleration along a sensing axis;
    (a) a main support;
    (b) a frame fabricated of fused quartz pivotally connected to the support for pendulous movement about a hinge axis with a component of motion along the sensing axis;
    (c) a proofmass comprising a pendulum fabricated of fused quartz pivotally conducted to the frame for movement about a compensation axis spaced from and generally parallel to the hinge axis; and
    (d) transducer means comprising a pair of crystalline quartz transducers connected between the pendulum and the support and having a greater coefficient of thermal expansion than fused quartz for sensing forces produced by acceleration of the proofmass along the sensing axis, with any difference in thermal expansion between the transducers and the elements fabricated of fused quartz resulting in rotation of the pendulum about the compensation axis.

2. The device of claim 1 wherein the proofmass is connected to the frame by a torsional hinge which extends along the compensation axis.

3. The device of claim 1 wherein the proofmass is connected to the frame by a flexure which is adapted to bend about the compensation axis.

4. In a device for measuring acceleration along a sensing axis;
    (a) a main support;
    (b) a frame connected to the support by a first hinge structure for pendulous movement about a hinge axis with a component of motion in the direction of the sensing axis;
    (c) a proofmass assembly comprising a pendulum and a pair of proofmass weights conduced to the frame by a second hinge structure for movement about a compensation axis spaced from and parallel to the hinge axis;
    (d) said support, said frame, said pendulum and said first and second hinge structures being formed as an integral structure of fused quartz; and
    (d) a pair of crystalline quartz force transducers connected between the pendulum and the support for monitoring forces produced by acceleration of the proofmass assembly along the sensing axis, with any difference in thermal expansion between the transducers and the elements fabricated of fused quartz resulting in rotation of the pendulum about the compensation axis.

5. The device of claim 4 wherein the first hinge structure comprises a pair of flexures spaced apart along the hinge axis and connected between the support and the frame.

6. The device of claim 4 wherein the second hinge structure comprises a pair of torsion hinges extending along the compensation axis between opposite ends of the pendulum and the frame.

7. The device of claim 4 wherein the frame comprises a U-shaped bridge having a pair of generally parallel arms, and the second hinge structure comprises a pair of flexures connected between the pendulum and the arms of the bridge.

* * * * *